United States Patent
Paielli et al.

(10) Patent No.: US 11,598,280 B2
(45) Date of Patent: Mar. 7, 2023

(54) SYSTEM AND METHOD FOR MEASURING TORQUE AND SPEED OF AN AXLE

(71) Applicant: Dana Heavy Vehicle Systems Group, LLC, Maumee, OH (US)

(72) Inventors: Perry M. Paielli, Sand Creek, MI (US); Michael Z. Creech, Ann Arbor, MI (US); Jeremy M. Frenznick, Brighton, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 224 days.

(21) Appl. No.: 16/855,218

(22) Filed: Apr. 22, 2020

(65) Prior Publication Data

US 2021/0332770 A1  Oct. 28, 2021

(51) Int. Cl.
| | |
|---|---|
| F02D 41/14 | (2006.01) |
| G01L 5/13 | (2006.01) |
| F16H 59/14 | (2006.01) |
| F16H 61/00 | (2006.01) |

(52) U.S. Cl.
CPC ......... *F02D 41/1497* (2013.01); *F16H 59/14* (2013.01); *G01L 5/13* (2013.01); *F02D 2200/101* (2013.01); *F02D 2200/1004* (2013.01); *F16H 2059/148* (2013.01); *F16H 2061/009* (2013.01)

(58) Field of Classification Search
CPC ......... F02D 41/1497; F02D 2200/1004; F02D 2200/101; F16H 59/14; F16H 2059/148; F16H 2061/009; F16H 2048/207; F16H 48/00; G01L 5/13
See application file for complete search history.

(56) References Cited

U.S. PATENT DOCUMENTS

| | | | | |
|---|---|---|---|---|
| 4,937,522 A | * | 6/1990 | Gee | B60T 8/171 |
| | | | | 310/155 |
| 5,486,757 A | * | 1/1996 | Easley | G01P 3/488 |
| | | | | 29/434 |
| 5,992,243 A | | 11/1999 | Leeper | |
| 6,511,395 B1 | * | 1/2003 | Irwin | G01P 3/488 |
| | | | | 310/168 |
| 7,520,183 B2 | | 4/2009 | Kouduki et al. | |
| 8,009,027 B2 | | 8/2011 | Thomas et al. | |
| 8,015,886 B2 | | 9/2011 | Lohr et al. | |
| 2012/0078476 A1 | | 3/2012 | Li et al. | |
| 2015/0276050 A1 | * | 10/2015 | Fodor | F16H 59/14 |
| | | | | 701/60 |
| 2016/0047450 A1 | * | 2/2016 | Steidl | F16H 48/14 |
| | | | | 475/230 |
| 2016/0263995 A1 | * | 9/2016 | Yoshimura | B60K 17/35 |

(Continued)

FOREIGN PATENT DOCUMENTS

| | | | |
|---|---|---|---|
| CN | 105162384 A | * | 12/2015 |
| EP | 1271120 A1 | | 1/2003 |
| WO | 0033043 A1 | | 6/2000 |

*Primary Examiner* — Kurt Philip Liethen
(74) *Attorney, Agent, or Firm* — McCoy Russell LLP

(57) ABSTRACT

Methods and systems for estimating an amount of torque that is transferred via a differential ring gear assembly are described. In one example, axial displacement of the differential ring gear assembly is determined and converted into a torque estimate. The torque estimate may be used to verify other powertrain torque estimates or for closed loop torque control.

19 Claims, 6 Drawing Sheets

(56) References Cited

U.S. PATENT DOCUMENTS

| | | | |
|---|---|---|---|
| 2017/0106872 A1* | 4/2017 | Imamura | B60W 30/20 |
| 2018/0045749 A1* | 2/2018 | Knapke | G01P 3/487 |
| 2019/0086440 A1* | 3/2019 | Pommies | F16H 48/38 |
| 2020/0164743 A1* | 5/2020 | Frenznick | B60K 23/0808 |

* cited by examiner

SYSTEM AND METHOD FOR MEASURING TORQUE AND SPEED OF AN AXLE

FIELD

The present disclosure relates to a system and method for measuring torque and speed of an axle. The system and method allow for closed loop control of a powertrain propulsion device and inference of other powertrain control variables.

BACKGROUND AND SUMMARY

A vehicle may include one or more propulsion sources to provide power to vehicle wheels. The propulsion sources may be commanded to provide a desired wheel torque that may be requested via a vehicle's driver or an automated driver. The propulsion source may generate a torque that is sufficient to generate the desired wheel torque; however, the actual wheel torque may be different than the desired wheel torque due to clutch slippage, manufacturing tolerances, wheel slip, torque converter efficiency losses, and other vehicle operating conditions.

One way to estimate the actual wheel torque may be to install strain gauges at the vehicle's wheels. The strain gauges may be installed within the vehicle wheels and the strain gauges may supply signals to a controller via slip rings or radio frequency transmitters so that actual wheel torque may be determined. Nevertheless, installing strain gauges at vehicle wheels may be cost prohibitive and the possibility of receiving the strain gauge signals over a longer period of time may be less than robust. Therefore, it may be desirable to provide a robust and cost effective way of determining torque of a powertrain.

The inventors herein have recognized the above-mentioned issues and have developed a method for estimating a torque of a powertrain, comprising: measuring a position of a differential ring gear assembly; and estimating the torque of the powertrain via a controller in response to the position of the differential ring gear assembly.

By measuring a distance of axial movement of a ring gear assembly, it may be possible to provide the technical result of determining torque that is delivered to an axle of a vehicle without having to install strain gauges at the vehicle's wheels. In addition, installation of a ring gear assembly position sensor may be less costly and complex as compared to strain gauges. Further, signal transmission from a ring gear assembly position sensor may be more robust than that of strain gauge sensors.

The present description may provide several advantages. In particular, the approach may provide powertrain torque feedback at low cost. In addition, the approach may provide for robust sensing and signals. Further, the approach may simplify torque determination for a powertrain.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
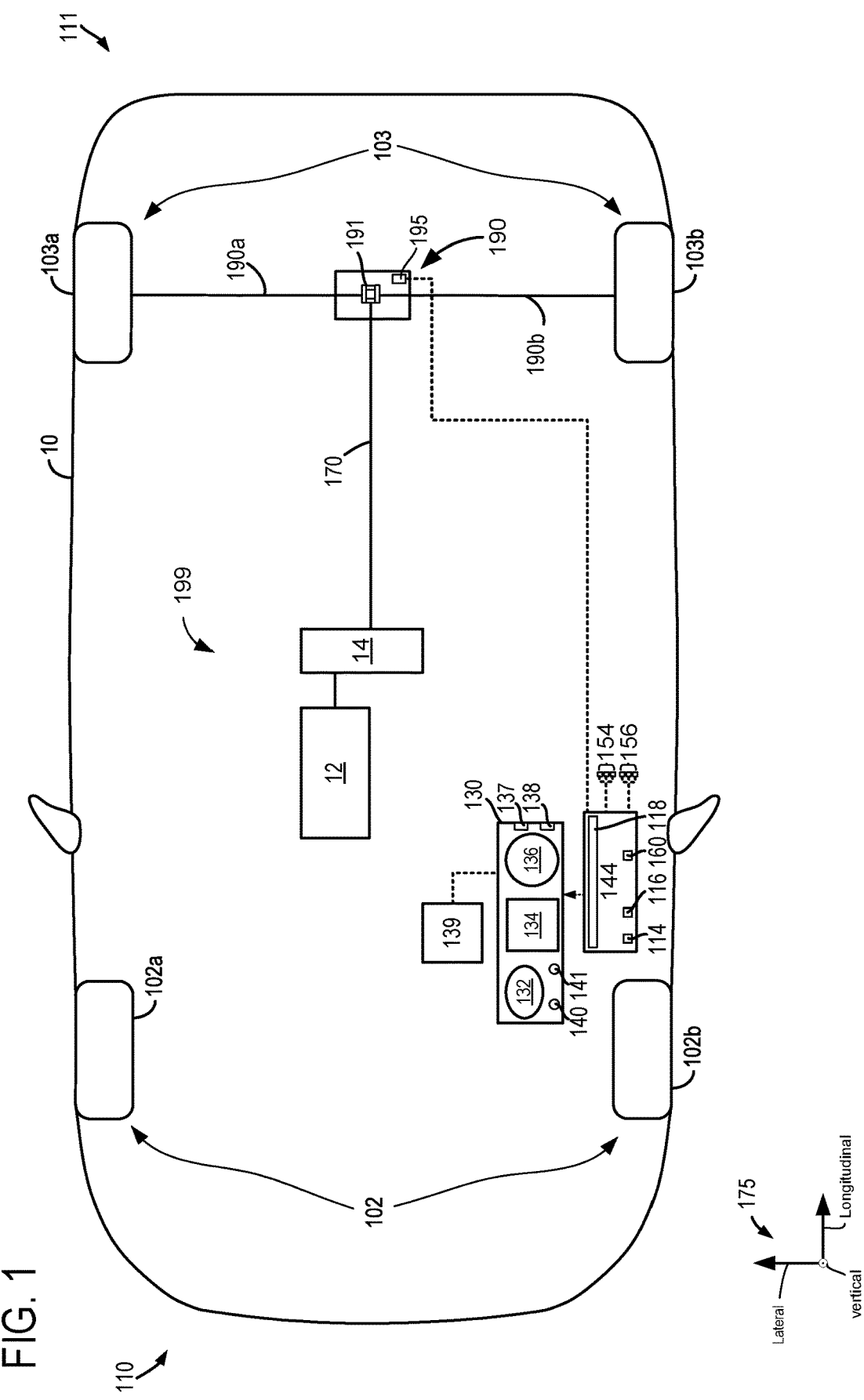
FIG. 1 is a schematic diagram of a driveline assembly and control circuitry is shown.
Figure 2A:
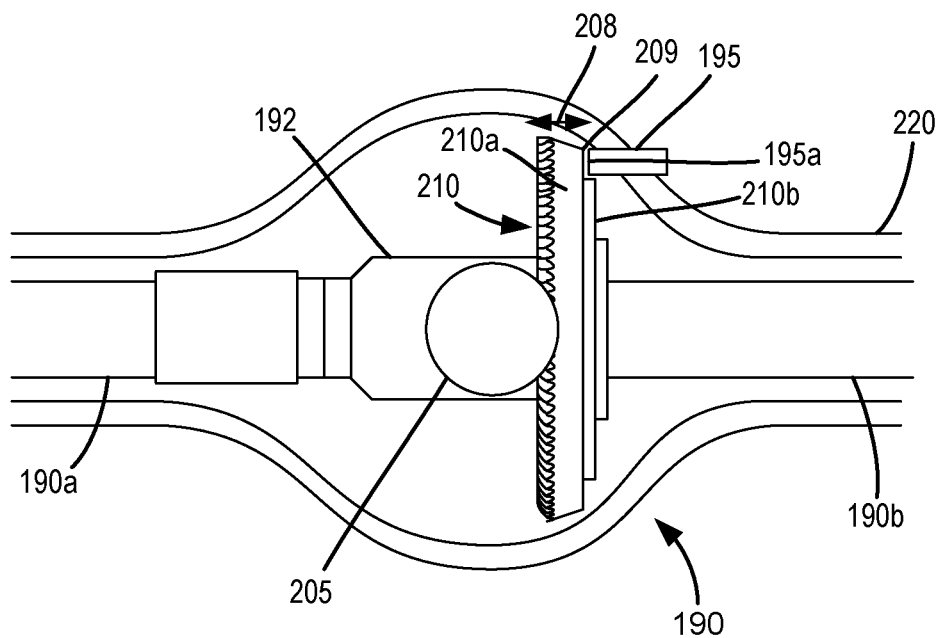
FIGS. 2A-2C show an example axle differential and sensors.
Figure 2B:
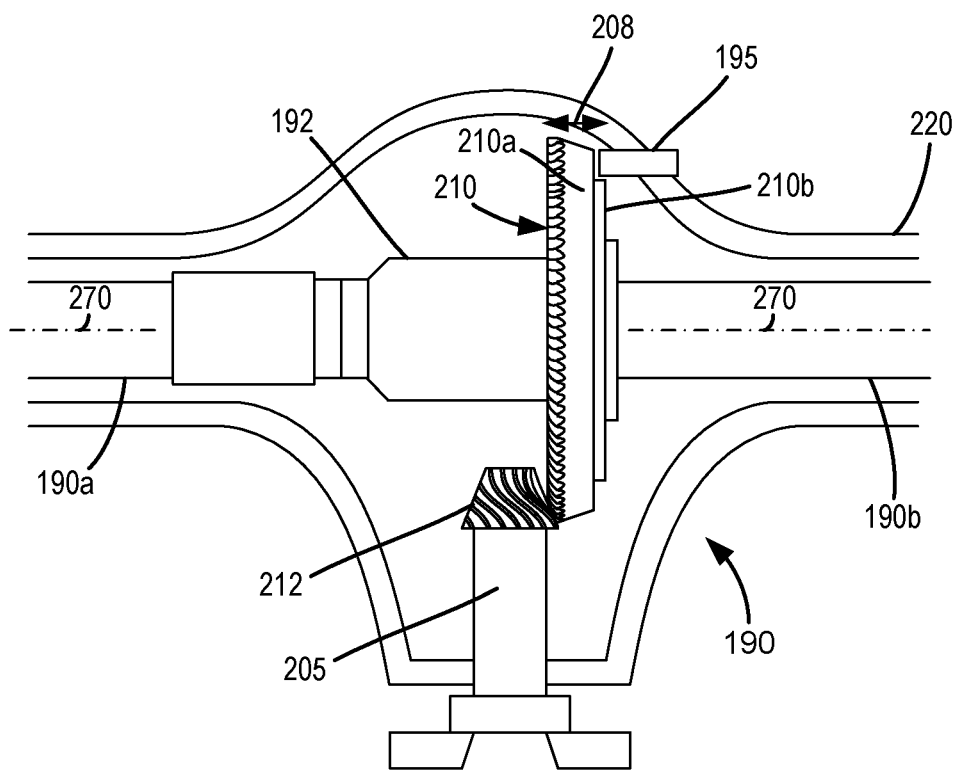
Figure 2C:
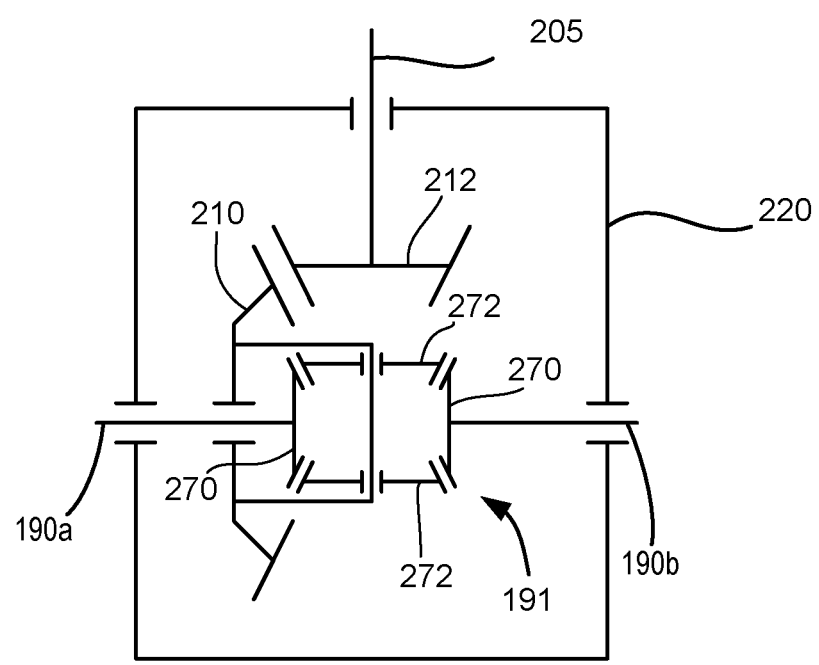
Figure 3A:
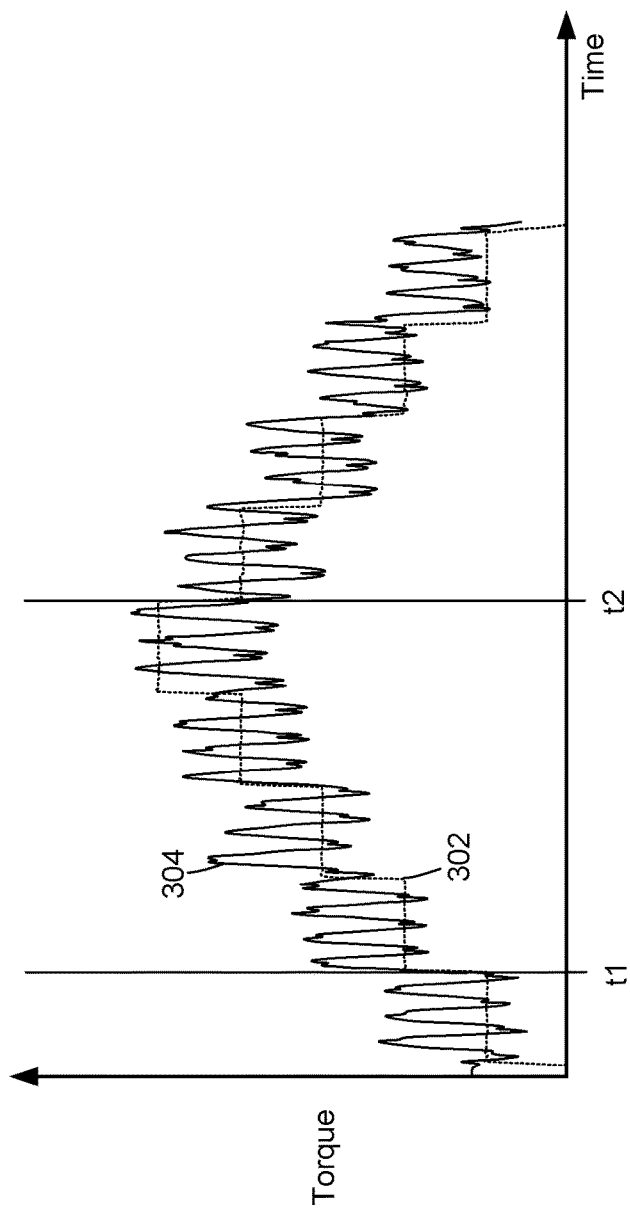
FIGS. 3A and 3B show graphical representations of torque supplied to an axle and ring gear assembly position sensor output.
Figure 3B:
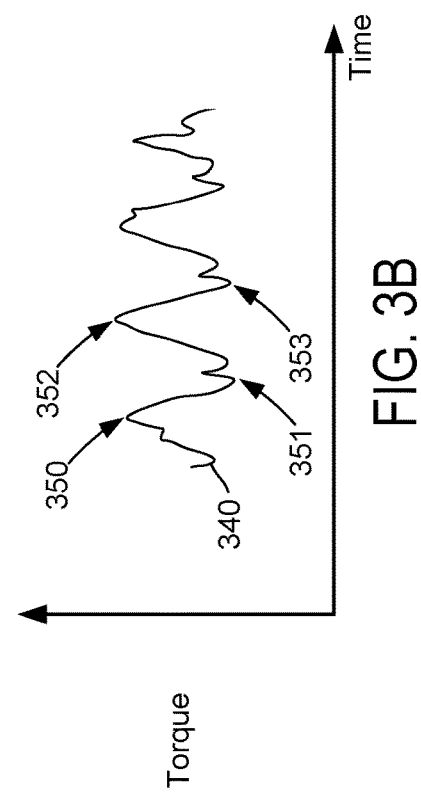
Figure 4:
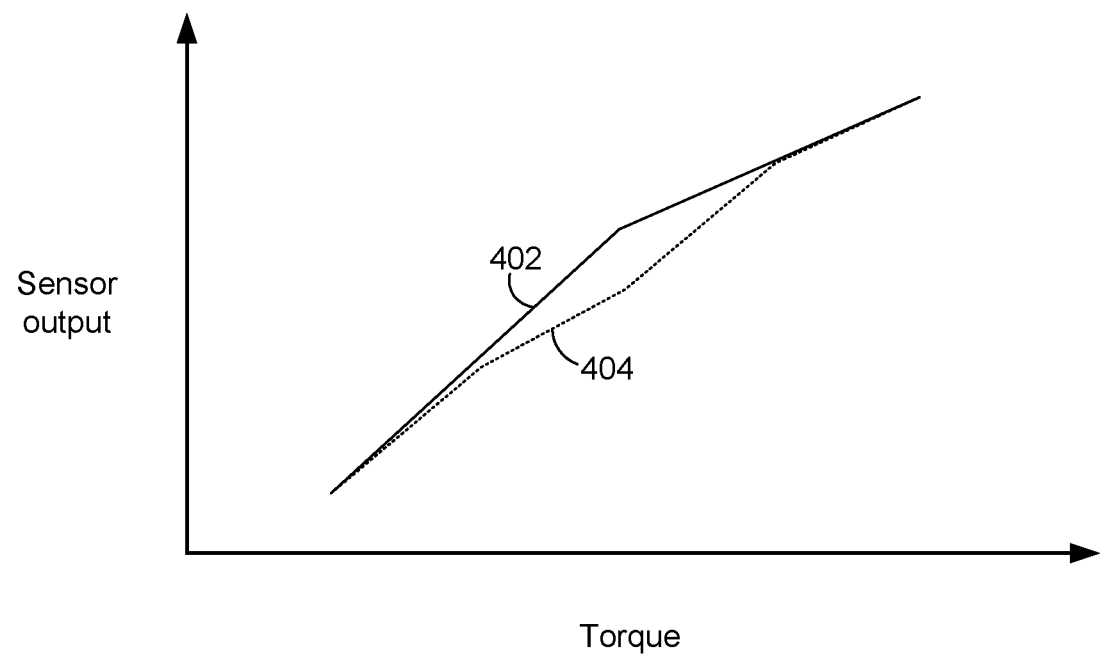
FIG. 4 shows a relationship between torque input to a ring gear assembly and output of a ring gear assembly position sensor.
Figure 5:
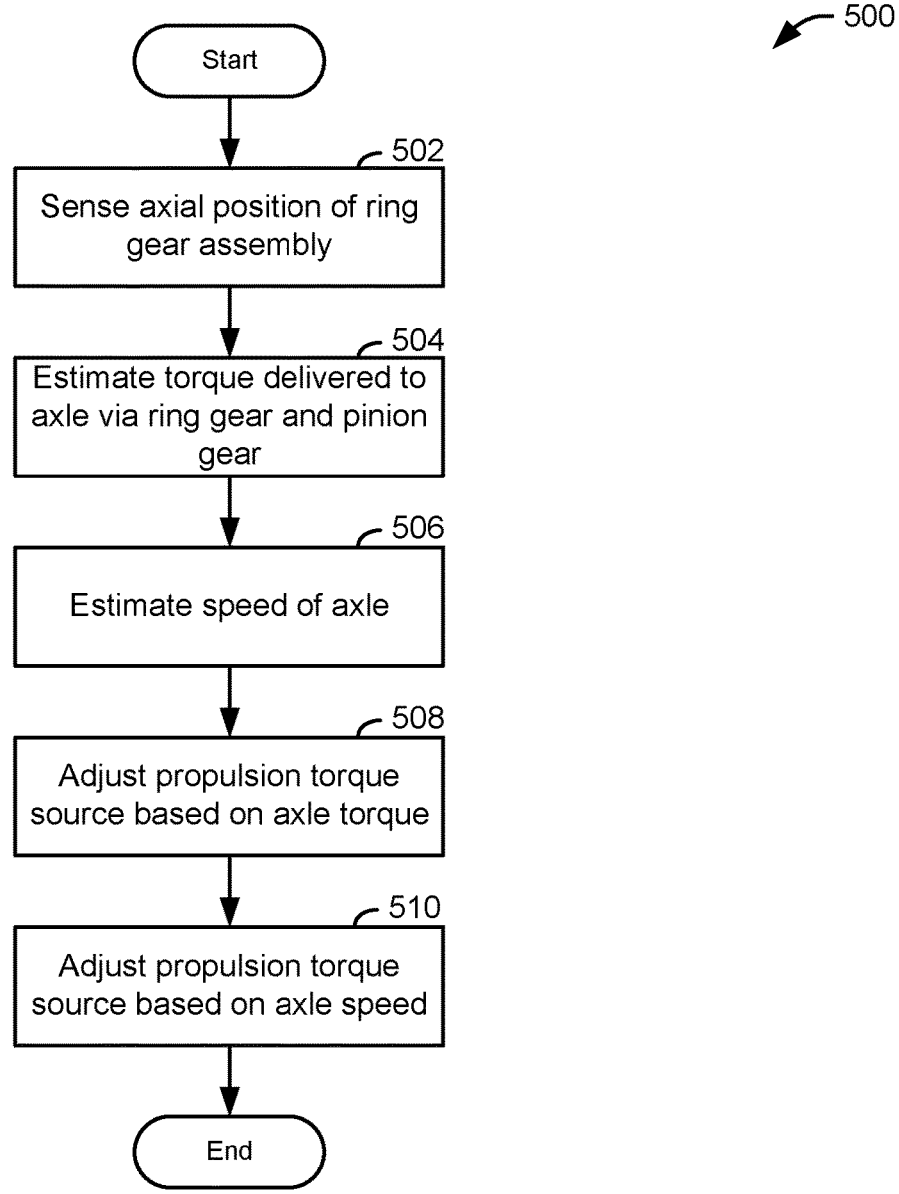
FIG. 5 is a flowchart of an example method for determining torque delivered to an axle and operating a propulsion source.

The following description relates to systems and methods for determining torque that is delivered to an axle. The axle may include a differential ring gear assembly and two axle half shafts. The torque may be determined as a function of ring gear assembly axial position. An example powertrain or driveline is shown in FIG. 1. FIGS. 2A-2C show alternative views of an example axle. Axle input torque and axle torque as determined from output of a ring gear assembly position sensor is shown in FIG. 3A. Ring gear assembly position sensor output signal features are shown in FIG. 3B. A relationship or transfer function between an amount of torque input to an axle and output of a ring gear assembly position sensor is shown in FIG. 4. An example method for determining axle torque and operation of a vehicle propulsion source is shown in FIG. 5.

FIG. 1 illustrates an example vehicle driveline 199 included in vehicle 10. Mechanical connections are shown in FIG. 1 as solid lines and electrical connections are indicated as dashed lines.

Vehicle 10 includes a front side 110 and a rear side 111. Vehicle 10 includes front wheels 102 and rear wheels 103. In this example, vehicle 10 is configured as a two wheel drive vehicle; however, in other examples, vehicle 10 may be configured as a four wheel drive vehicle. Vehicle 10 includes a propulsion source 12 that may selectively provide propulsive effort to rear axle 190. Propulsion source 12 may be an internal combustion engine (e.g., spark ignited or diesel), or alternatively, propulsion source 12 may be an electric machine (e.g., a motor/generator), or a combination thereof. Propulsion source is shown mechanically coupled to gearbox 14, and gearbox 14 is mechanically coupled to rear axle 190. Propulsion source 12 may provide mechanical power to gearbox 14. Rear axle 190 may receive mechanical power from gearbox 14 via driveshaft 170 so that mechanical power may be transmitted to rear wheels 103.

Rear axle 190 comprises two half shafts, including a first or right haft shaft 190a and a second or left half shaft 190b. The rear axle 190 may be an integrated axle that includes a differential gear set 191. Differential gear set 191 may be open when vehicle 10 is traveling on roads and negotiating curves so that right rear wheel 103a may rotate at a different speed than left rear wheel 103b. Differential gear set 191 allows vehicle 10 to turn without dragging right rear wheel 103a or left rear wheel 103b. Rear axle 190 also includes a ring gear assembly position sensor 195 that is configured to measure axil movement of a ring gear assembly. In one example, ring gear assembly position sensor is a non-contact eddy current sensor. In other examples, ring gear assembly position sensor may be a capacitive sensor, Hall effect sensor, ultra-sonic, or optical sensor. Controller 144 may receive ring gear assembly position signals from ring gear position sensor 195. Controller 144 may determine various control parameters from output of ring gear assembly position sensor 195. For example, controller 144 may determine axle torque and ring gear speed from output of ring gear assembly position sensor 195. In addition, controller 144 may estimate other control parameters from axle torque and ring gear speed.

Controller 144 may communicate with dash board 130, propulsion source 12, rear axle 190, and other controllers where present. Controller 144 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). Controller 144 may receive signals from sensors 154 and provide control signal outputs to actuators 156. Sensors 154 may include but are not limited to ring gear assembly position sensor 195. Actuators 156 may include but are not limited to propulsion source torque actuators (e.g., throttles, inverters, fuel injectors, etc.).

Vehicle propulsion system may also include a dashboard 130 that an operator of the vehicle may interact with. Dashboard 130 may include an interactive weather data display and notification system 134 that may communicate weather forecast data to controller 144. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via controller 144. As such, in some examples, the vehicle operator may communicate via display system 132 with an internet site or software application (app) and controller 144. Dashboard 130 and devices included therein may be supplied with electrical power via battery 139. Battery 139 may also supply power to controller 114 and a starter motor (not shown) for propulsion source 12.

Dashboard 130 may further include an operator interface 136 via which the vehicle operator may adjust the operating status of the vehicle. Specifically, the operator interface 136 may be configured to initiate and/or terminate operation of the vehicle driveline (e.g., propulsion source 12) based on an operator input. Various examples of the operator interface 136 may include interfaces that require a physical apparatus, such as an active key, that may be inserted into the operator interface 136 to activate the propulsion source 12 and to turn on the vehicle 10, or may be removed to shut down the propulsion source 12 and to turn off the vehicle. Other examples may include a passive key that is communicatively coupled to the operator interface 136. The passive key may be configured as an electronic key fob or a smart key that does not have to be inserted or removed from the interface 136 to operate the propulsion source 12. Still other examples may additionally or optionally use a start/stop button that is manually pressed by the operator to start or shut down the propulsion source 12. Spatial orientation of vehicle 10 is indicated via axes 175.

Turning now to FIG. 2A, a detailed view of axle 190 is shown. In particular, FIG. 2A shows a cross section of axle 190 looking toward pinion 205. Axle 190 includes right half shaft 190a and left half shaft 190b. Axle 190 also includes a ring gear assembly 210 that includes ring gear 210a. Ring gear 210a may be fastened to a flange 210b and the flange 210b may be coupled to a differential gear set that may be enclosed in differential gear set carrier 192. Axle housing 220 supports differential gear set carrier 192 and ring gear assembly 210. Ring gear assembly position sensor 195 is coupled to axle housing 220 and ring gear assembly position sensor 195 measures a distance from ring gear assembly position sensor face 195a to ring gear assembly face 209. Thus, ring gear assembly position sensor 195 measures axial travel as indicated by arrow 208 of ring gear assembly face 209. In particular, ring gear assembly position sensor 195 generates a magnetic field that may be altered in the presence of the ring gear assembly face 209 to generate a voltage that indicates the axial position of ring gear assembly face 209 relative to ring gear assembly position sensor face 195a. The axial direction may be parallel with a longitudinal axis of axle half shafts and indicated by lines 270.

Differential gear set carrier 192 includes a differential gear set (shown in greater detail in FIG. 2C) that allows right rear wheel 103a to rotate at a same speed as left rear wheel 103b when vehicle 10 is traveling on a straight road. The differential gear set allows right rear wheel 103a to rotate at a different speed than left rear wheel 103b when vehicle 10 is negotiating curves. The differential gear set allows vehicle 10 to turn without dragging right rear wheel 103a or left rear wheel 103b.

Referring now to FIG. 2B, a cross section plan view of rear axle 190 is shown. In this view, pinion gear 212 is visible and it engages with ring gear 210a. Pinion gear 212 may rotate ring gear 210a, and ring gear assembly 210 may rotate differential gears in differential gear carrier 192 to rotate the left and right half shafts 190a and 190b. Pinion gear 210 is at one end of pinion 205. Pinion 205 may be coupled to drive shaft 170 shown in FIG. 1.

Referring now to FIG. 2C, a stick diagram of gearing within rear axle 190 is shown. Axle housing 220 supports pinion 205, half shafts 190a and 190b, along with differential gear set 191. Pinion gear 212 may deliver torque to ring gear 210a and ring gear 210a may deliver torque to differential gear set pinion gears 272. Differential gear set pinion gears 272 may transfer torque to differential side gears 270. Differential side gears 270 may be coupled to half shafts 190a and 190b. Ring gear 210a may move in an axial direction as shown in FIG. 2A when torque is delivered from pinion 205 to ring gear 210a. An example range of axial motion of ring gear 210a is shown in FIG. 4.

The system of FIGS. 1-2C provides for a system for estimating torque transmitted through an axle, comprising: a differential ring gear assembly; and a non-contact position sensor configured to measure an axial position of the differential ring gear assembly without touching the differential ring gear assembly. The system further comprises an axle housing, the non-contact position sensor coupled to the axle housing. The system includes where the non-contact position sensor is not in contact with the differential ring gear assembly. The system further comprises a controller including executable non-transitory instructions to estimate an amount of torque transferred via the differential ring gear assembly in response to output of the non-contact position sensor. The system further comprises additional executable non-transitory instructions to estimate a speed of the differential ring gear assembly in response to output of the non-contact position sensor. The system includes where the amount of torque transferred via the differential ring gear assembly is determined while the differential ring gear assembly is rotated. The system includes where the speed of the differential ring gear assembly is determined while the differential ring gear assembly is rotated.

Referring now to FIG. 3A, a plot of an example axle torque measurement sequence is shown. The vertical axis represents torque delivered to a pinion shaft of an axle and torque increases in the direction of the vertical axis arrow. The horizontal axis represents time and time in the sequence increases from the left to right side of the plot.

Dotted line 302 represents an amount of torque that is delivered to the pinion shaft of the axle (e.g., 205 of FIG. 2A). Solid line 304 represents axle torque applied to the ring gear assembly via the pinion shaft as determined from ring gear assembly axial position. In this sequence, an amount of torque that is applied to the pinion shaft is increased in steps and then it is decreased in steps to show that torque determined from axial movement of a ring gear assembly may follow torque that is input to a pinion shaft.

At time t1, the torque that is input to the pinion shaft is increased in a step-wise manner. The average value of the ring gear assembly based axle torque also increases in a step-wise manner in response to the increase in torque that is applied to the pinion shaft. Between time t1 and time t2, the amount of torque that is input to the pinion shaft is increased step-wise several times. At time t2, the torque that is input to the pinion shaft is decreased in a step-wise manner. The average value of the ring gear assembly based axle torque decreases in a step-wise manner in response to the decrease in torque that is applied to the pinion shaft. It may be observed that the ring gear assembly based axle torque increases and decreases proportionately with the torque that is input to the pinion shaft. It should also be noted that the ring gear assembly based axle torque exhibits a cyclic pattern. The cyclic pattern may be due to ring gear assembly run-out where the position of a face of the ring gear changes as the ring gear rotates. The run-out may be related to manufacturing tolerances and other influences. This cyclic movement that is a function of ring gear assembly rotational position relative to the ring gear assembly position sensor may be useful to determine speed of the ring gear.

Referring now to FIG. 3B, a detailed view of the cyclic nature of ring gear assembly based axle torque is shown. The vertical axis represents torque delivered to a pinion shaft of an axle and torque increases in the direction of the vertical axis arrow. The horizontal axis represents time and time in the sequence increases from the left to right side of the plot.

Trace 340 is an example of ring gear assembly based axle torque when the pinion and ring gear are rotated at constant speed and a constant torque is applied to the pinion 205. Trace 340 exhibits a cyclic pattern that may be related to run-out of the ring gear assembly. The cyclic pattern repeats for each revolution of the ring gear assembly. For example, one rotation of the ring gear occurs between peaks or maximum values at 350 and 352 of trace 340. Likewise, one rotation of the ring gear occurs between valleys or minimums at 351 and 353. Therefore, a rotational speed of the ring gear may be determined via determining the amount of time between peaks in the trace 340. Alternatively, rotational speed of the ring gear may be determined via determining the amount of time between valleys in the trace 340. Locations of peaks and valleys in the trace may be determined by finding locations in trace 340 where the derivative of trace 340 is substantially zero.

Referring now to FIG. 4, an example relationship between voltage output of a non-contact ring gear assembly position sensor and torque applied to pinion 205 of an axle is shown. The vertical axis represents sensor output voltage and sensor output voltage increases in the direction of the vertical axis arrow. The horizontal axis represents amount of torque that is applied to a pinion of an axle and the amount of torque increases in the direction of the horizontal axis arrow.

Trace 402 represents the relationship between the voltage output of a non-contact ring gear assembly position sensor and torque applied to pinion when torque applied to the pinion changes from a lower torque to a higher torque. Trace 404 represents the relationship between the voltage output of a non-contact ring gear assembly position sensor and torque applied to pinion when torque applied to the pinion changes from a higher torque to a lower torque. Via this relationship, a sensor voltage may reference a function storing values representing this relationship and the function outputs a torque at the ring gear assembly.

Referring now to FIG. 5, an example method for determining axle torque and operating a propulsion source responsive to the axle torque is shown. At least portions of method FIG. 5 may be performed via a controller in cooperation with the system of FIGS. 1-2C. In some examples, at least portions of method FIG. 5 may be incorporated as executable instructions stored in non-transitory memory of a controller. In addition, some portions of the method may be performed via the controller transforming operating states of devices and actuators in the physical world. The method of FIG. 5 may be applied to front and rear axles of a vehicle. The method of FIG. 5 is executed while the ring gear assembly is rotating.

At 502, method 500 senses an axial position of a ring gear assembly. In one example, the axial position of the ring gear assembly may be determined via a ring gear assembly position sensor. The ring gear assembly position sensor outputs a signal that is indicative of ring gear assembly axial position. Method 500 proceeds to 504.

At 504, method 400 estimates an amount of torque that is delivered to the ring gear assembly via the pinion (e.g., 205 of FIG. 2A). When torque is input to the ring gear assembly, the ring gear axial position changes slightly. The change in ring gear assembly axial position may be indicative of an amount of torque that is input to the ring gear assembly via the pinion. The output of the ring gear assembly position sensor is applied to reference a function or table that describes torque at the ring gear, or alternatively torque at the pinion, as a function of ring gear assembly axial position. The table or function outputs a pinion or ring gear assembly torque.

In some examples, method 500 may pass the pinion or ring gear output torque that is output from the table or function through a low pass filter to average the output of the table or function, thereby removing an alternating component of the torque signal that may be due to ring gear assembly run-out. Method 500 proceeds to 506.

At 506, method 500 estimates speed of the axle ring gear assembly. In one example, method 500 may determine an amount of time between peaks or valleys as shown in FIG. 3 to determine speed of the axle ring gear. For example, method 500 may generate a vector or data set of derivative values of the unfiltered, or alternatively filtered, output of the pinion or ring gear assembly torque estimate over a predetermined time duration. Alternatively, method 500 may generate a vector or data set of derivative values of the unfiltered, or alternatively filtered, output of the ring gear assembly position sensor over a predetermined time duration. Method 500 may determine amounts of time between values in the vector of derivative values that are within a predetermined amount of zero (e.g., peaks or valleys in the ring gear position sensor output) to determine the period of the torque signal or sensor output signal. For example, method 500 may determine an amount of time between data at 350 of FIG. 3B and data at 352 of FIG. 3B to determine the period of the signal. Once the period is determined, the speed of rotation of the ring gear may be determined via F=1/T where F is the frequency (revolutions/second) and T is the period. In addition, values in the vector of derivative values that are within the predetermined amount of zero may not be considered as relevant data if their corresponding value in the sensor or torque data is of insufficient magnitude.

In some examples, method 500 may perform a discrete Fourier transform (DFT) to determine the ring gear assembly speed. For example, method 500 may take ring gear assembly position sensor data for a predetermined amount of time and then process the data via the following equation:

$$X_k = \sum_{n=0}^{N-1} x_n e^{-2\pi i k n / N}$$

where N is the total number of samples taken from ring gear assembly position sensor output, X is DFT output, n is the present sample number, k is the current frequency, e is a constant, and x is the value of the signal at time n. The rotational frequency of the ring gear assembly may be determined from frequencies in the Xk vector (e.g., the frequency with the greatest amplitude or power level). Method 500 proceeds to 508.

At 508, method 500 may adjust torque of the vehicle's propulsion source in response to the axle torque that is determined from the ring gear assembly position sensor output. For example, if driver demand torque is 300 Newton-meters (Nm) at the wheels and the ring gear or pinion torque determined at 504 multiplied by a gear ratio between the pinion or ring gear and the wheels is 280 Nm, then torque of the propulsion device may be increased so that wheel torque matches the requested driver demand torque (e.g., 300 Nm). In this way, the powertrain or driveline torque may be closed loop controlled based on the axle torque (e.g., torque at the pinion or at the ring gear). The propulsion source torque may be adjusted via adjusting a position or operating state of a propulsion source torque actuator. For example, if the propulsion source is an engine, engine torque may be increased via adjusting a throttle position, cam timing, fuel injection timing, and spark timing. If the propulsion source is an electric machine, output of the electric machine may be adjusted via adjusting voltage and frequency of electric power that is applied to the electric machine via adjusting output of an inverter. Method 500 proceeds to 510.

At 510, method 500 may adjust speed of the vehicle's propulsion source in response to the axle speed that is determined from the ring gear assembly position sensor output. For example, if the vehicle is in a speed control mode and the vehicle speed set point is 100 kilometers/hour, but ring gear assembly speed indicates that the vehicle is traveling at 90 kilometer/hour, torque of the vehicle's propulsion source may be increased to increase vehicle speed to the requested 100 kilometers/hour speed. Method 500 proceeds to exit.

In this way, a change in axial position of a ring gear assembly may be converted to an axle torque or another torque of the driveline. Torques other than the pinion or ring gear torque may be estimated by multiplying the pinion torque or ring gear torque by gear ratios between the pinion or ring gear and the driveline location where a torque estimate is desired.

Thus, the method of FIG. 5 provides for a method for estimating a torque of a powertrain, comprising: measuring a position of a differential ring gear assembly; and estimating the torque of the powertrain via a controller in response to the position of the differential ring gear assembly. The method includes where the position of the differential ring gear assembly is an axial position of the differential ring gear assembly. The method includes where the position of the differential ring gear assembly is determined via a non-contact sensor. The method includes where the non-contact sensor is an eddy current sensor. The method further comprises adjusting torque of a propulsion source in response to the estimated torque of the powertrain. The method includes where the torque of the powertrain is an amount of torque delivered to half shafts of an axle from a powertrain propulsion source. The method includes where the position of the differential ring gear assembly is measured relative to a position of a sensor, and where the sensor is mounted to an axle housing. The method further comprises rotating the differential ring gear assembly via a powertrain propulsion source while measuring the position of the differential ring gear assembly.

The method of FIG. 5 also provides for a method for estimating a speed of a powertrain, comprising: measuring a position of a differential ring gear assembly; and estimating the speed of the powertrain via a controller in response to the position of the differential ring gear assembly. The method further comprises estimating a torque of the powertrain in response to the position of the differential ring gear assembly. The method includes where the speed is estimated via a Fourier transform. The method includes where the torque is estimated via averaging output of a differential ring gear assembly position sensor. The method includes where the speed is estimated via determining a period or frequency of a cyclic output of a differential ring gear assembly position sensor.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for estimating a torque of a powertrain, comprising:
   measuring a distance between a differential ring gear assembly and a sensor in an axial direction via the sensor, where the axial direction is parallel to a longitudinal axis of half shafts of an axle;
   estimating the torque of the powertrain via a controller in response to the distance; and
   adjusting torque of a propulsion source in response to the estimated torque of the powertrain.

2. The method of claim 1, where the position of the differential ring gear assembly is an axial position of the differential ring gear assembly.

3. The method of claim 1, where the sensor is a non-contact sensor.

4. The method of claim 3, where the non-contact sensor is an eddy current sensor.

5. The method of claim 1, where the torque of the powertrain is an amount of torque delivered to half shafts of an axle from a powertrain propulsion source.

6. The method of claim 1, where the position of the differential ring gear assembly is measured relative to a position of a sensor, and where the sensor is mounted to an axle housing.

7. The method of claim 6, further comprising rotating the differential ring gear assembly via a powertrain propulsion source while measuring the position of the differential ring gear assembly.

8. A system for estimating torque transmitted through an axle, comprising:
   an axle including a differential ring gear assembly and two half shafts;
   a propulsion source;
   a non-contact position sensor configured to measure a position of the differential ring gear assembly in an axial direction without touching the differential ring gear assembly, where the axial direction is parallel to a longitudinal direction of the two half shafts; and
   a controller with executable, non-transitory instructions to adjust torque of the propulsion source in response to the measured position.

9. The system of claim 8, further comprising an axle housing, the non-contact position sensor coupled to the axle housing.

10. The system of claim 8, where the non-contact position sensor is not in contact with the differential ring gear assembly.

11. The system of claim 8, further comprising a controller including executable non-transitory instructions to estimate an amount of torque transferred via the differential ring gear assembly in response to output of the non-contact position sensor.

12. The system of claim 11, further comprising additional executable non-transitory instructions to estimate a speed of the differential ring gear assembly in response to output of the non-contact position sensor.

13. The system of claim 12, where the amount of torque transferred via the differential ring gear assembly is determined while the differential ring gear assembly is rotated.

14. The system of claim 13, where the speed of the differential ring gear assembly is determined while the differential ring gear assembly is rotated.

15. A method for estimating a speed of a powertrain, comprising:
   measuring a distance between a differential ring gear assembly and a sensor in an axial direction via the sensor, where the axial direction is parallel to a longitudinal axis of half shafts of an axle;
   estimating the speed of the powertrain via a controller in response to output of the sensor; and
   adjusting the powertrain in response to the estimated speed.

16. The method of claim 15, further comprising estimating a torque of the powertrain in response to the distance between the differential ring gear assembly and the sensor.

17. The method of claim 16, where the speed is estimated via a Fourier transform.

18. The method of claim 16, where the torque is estimated via averaging output of the sensor.

19. The method of claim 15, where the speed is estimated via determining a period or frequency of a cyclic output of the sensor.

* * * * *